United States Patent [19]

Colangelo et al.

[11] 4,316,242
[45] Feb. 16, 1982

[54] WIDE INPUT RANGE, TRANSIENT-IMMUNE REGULATED FLYBACK SWITCHING POWER SUPPLY

[75] Inventors: Dominick Colangelo, Cammillus; George F. Pfeifer, Liverpool; Gary B. Schumacher, Syracuse, all of N.Y.

[73] Assignee: General Electric Company, Schenectady, N.Y.

[21] Appl. No.: 184,062

[22] Filed: Sep. 4, 1980

[51] Int. Cl.³ .............................................. H02M 3/335
[52] U.S. Cl. ........................................ 363/21; 363/80
[58] Field of Search .................... 323/DIG. 1; 363/21, 363/79, 80

[56] References Cited

U.S. PATENT DOCUMENTS

| | | | |
|---|---|---|---|
| 3,305,756 | 2/1967 | Doss et al. | |
| 3,673,487 | 6/1972 | Hendrickson | |
| 3,697,851 | 10/1972 | Mast | 323/DIG. 1 |
| 3,697,857 | 10/1972 | El-Banna | |
| 3,701,937 | 10/1972 | Combs | |
| 3,911,352 | 10/1975 | Slack | |
| 4,005,351 | 1/1977 | Blum | 363/21 |
| 4,009,419 | 2/1977 | Ligman | |
| 4,131,843 | 12/1978 | Koyama et al. | 363/21 X |
| 4,156,273 | 5/1979 | Sato | 363/80 X |

OTHER PUBLICATIONS

Slack, "Design of Single-Ended DC-DC Converters," *Proceedings of Powercon2*, Second National Solid-State Power Conversion Conference, Oct. 1975, Vol. II, pp. 18-22.
Hamilton, "A Transistor Pulse Generator for Digital Systems", *IRE Transactions on Electronic Computers*, Sep. 1958, pp. 244-249.
Wu, "How to Design Transistor Blocking Oscillators", *Electronic Equipment Engineering*, Sep. 1960, pp. 73-76.
Rolfe, "Designing a Common-Emitter Blocking Oscillator", *Electronic Industries*, Jul. 1961, pp. 110-114.
Chen, Golan, and Millman, "Astable Blocking Oscillators-They Can Be Practical", Electronic Design; Part 1, Mar. 1, 1965, pp. 22-25, Part 2, Mar. 15, 1965, pp. 42-44.
Jansson, "A survey of converter circuits for switched mode power supplies", Application Information 469, *Mullard Techincal Communications*, vol. 12, No. 119, Aug. 1974.
Holet, "Optimizing Battery-Powered Transistor Inverter Design", General Electric Application Note 200.75, Semiconductor Products Department, Auburn, N.Y., Sep. 1976, pp. 3, 4, 45, 46.
"Flyback Converter Design", Application Note 123, Indiana General Ferrite Products.

*Primary Examiner*—William M. Shoop
*Attorney, Agent, or Firm*—Marvin Snyder; James C. Davis

[57] ABSTRACT

A low cost switching mode power supply particularly adapted for use in an electric vehicle is characterized by an extreme input voltage range, immunity to high input voltage transients, and stable operation. A negative voltage feedback arrangement applied to a controllable voltage clamp serves to continuously vary oscillation pulse width and frequency. The power supply includes an output filter capacitor, and, to compensate for phase lag introduced by the output filter capacitor, the negative feedback arrangement includes elements for introducing phase lead compensation. Preferably, the oscillation period is less than the duration of expected input voltage transients, and the power supply regulates right through such transients.

15 Claims, 13 Drawing Figures

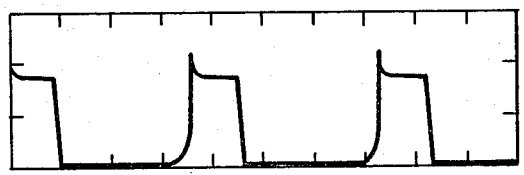
Fig. 2A
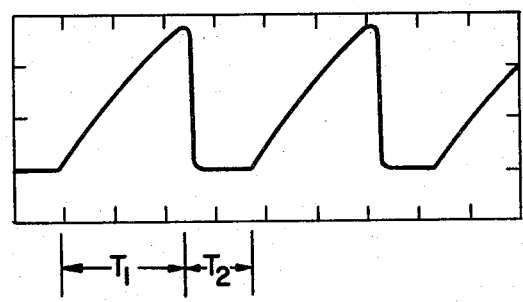
Fig. 2B
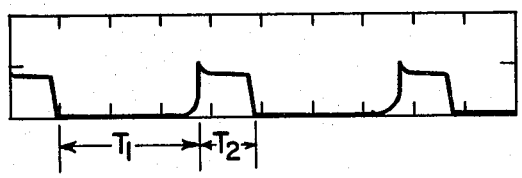
Fig. 3A  12 VOLTS
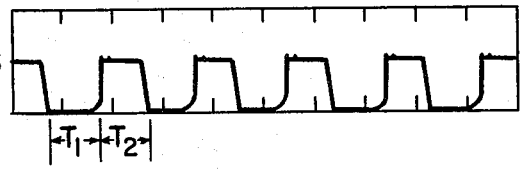
Fig. 3B  24 VOLTS
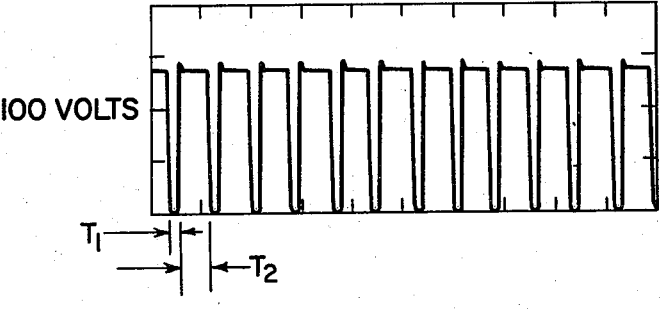
Fig. 3C  100 VOLTS

WIDE INPUT RANGE, TRANSIENT-IMMUNE REGULATED FLYBACK SWITCHING POWER SUPPLY

BACKGROUND OF THE INVENTION

The present relates generally to a low cost switching mode power supply and, more particularly, to such a power supply characterized by an extreme input voltage range, immunity to high input voltage transients, and stable operation.

One particular application for a low voltage power supply is to supply stable DC operating voltages for control circuitry of battery-powered vehicles, such as industrial vehicles, mining vehicles and over-the-road vehicles. These vehicles include large-capacity rechargable batteries, such as lead-acid batteries, supplying energy to electric motors through suitable heavy duty control circuitry. Typical motor control circuitry employs triacs or SCR's in various chopper circuits for high efficiency. More sophisticated vehicle power control systems implement a regenerative breaking techinque in order to partially recharge the batteries while braking the vehicle.

Such vehicles are manufactured in a wide range of configurations, varying greatly in power capability and battery voltage. For example, for various typical applications, nominal battery voltage may range from 24 volts to 144 volts. In addition to the wide range of battery nominal voltages, the terminal voltage of a particular battery varies widely during normal operating conditions. For example, although the nominal voltage of a single lead-acid battery cell is 2.0 volts, cell voltage may decrease to 1.0 volt for up to two minutes under extremely heavy load conditions, and may increase to 2.63 volts for one to five seconds during regenerative braking conditions. In addition, short term (e.g., 80 microsecond) repetitive transient voltage spikes of up to 460 volts, caused by the SCR chopper-controlled drive motor system and battery lead inductance, are present at the battery terminals.

In addition to the high capacity supplies for the drive motors in such electric vehicles, fairly low voltage (for example, 12 to 15 volt) DC supplies are needed for low signal level control functions, such as to implement a foot pedal accelerator control. In order to provide a steady, low voltage DC supply for control purposes, typical prior art electric vehicles include a relatively small battery, entirely separate from the batteries for supplying the vehicle motors. While such a solution is entirely acceptable from the standpoint of performance, it increases and complicates the effort required in keeping such vehicles maintained in operating condition. Not only must the main drive batteries be maintained in a charged condition, but the condition of the control battery must also be monitored, and the control battery must periodically either be recharged or replaced.

In those instances where power supplies have been employed in electric vehicles, the power supplies were closely matched to the input voltage supplied by the vehicle drive battery. For transient protection, such supplies typically employed a "brute force" filter comprising a series inductance and parallel capacitance.

While it is to these particular problems which the present invention is addressed, it will be appreciated that the power supply of the present invention is applicable to a variety of similar applications.

More particularly, the present invention is directed to the problem of providing a stable, low-voltage DC power suppy operable from a wide range of input voltages and transient conditions such as are described immediately above in the context of electric vehicles. There are two distinct aspects, both of which are addressed by the present invention.

First, while a wide range of such vehicles are manufactured including a wide range of nominal battery voltages for supplying the drive motors, the control circuits are quite similar, particularly insofar as their voltage requirements are concerned. Rather than expressly tailor a power supply to a single nominal battery voltage, thus requiring a large inventory of various different power supplies to meet the normal requirements, it is highly desirable that a single power supply operate well over a wide input voltage range such that it may be adaptable for use in a variety of different electric vehicles having a variety of nominal battery voltages, without concern for the selection of a particular power supply. By way of example, in accordance with the present invention, only two power supply models are required to cover the entire nominal battery voltage range of from 24 to 144 volts.

Second, the power supply must be capable of operating in the presence of extreme voltage transients such as are associated with a chopper-controlled DC motor.

As a specific example, a low input voltage range power supply operates from input voltages within the range of 12 to 111 volts, and withstands input transients of 230 volts. A high input voltage range power supply operates with input voltages within a range of 42 to 190 volts, and withstands input transients of 460 volts.

One particular form of known power supply is known as a switching mode "flyback" power supply wherein input voltage is supplied through a switching element to the primary winding of a power transformer such that current and magnetic flux gradually increase, and then the switching element is quickly opened to allow the magnetic field to rapidly collapse and induce a higher voltage than originally applied in either the same winding or a secondary winding. Flyback switching power supplies oscillate during operation. They are characterized by relative simplicity and consequent low cost. Since the oscillating frequency can be relatively high, for example within the range of 20 kHz to 200 kHz, a physically small and light weight transformer may be employed.

By way of example, one form of such a flyback mode power supply is disclosed in the Slack U.S. Pat. No. 3,911,352, entitled "Blocking Oscillator Type Power Supply with Power Foldback Short Circuit Protection." As the disclosure of that patent points out, such a power supply inherently has a certain degree of regulation as input voltages change. With higher input voltages, the current and flux in the primary winding have a greater rate of increase when the switching element turns ON, and the switching element turns OFF much sooner. The overall result is that a fairly constant amount of energy is delivered to the load circuit even in the face of input voltage changes. In addition, the Slack patent discloses an arrangement for monitoring the output voltage of the power supply, and for disabling the operation of the oscillator whenever input voltage exceeds a predetermined amount, thereby providing a form of output voltage reguation. In essence, the circuit of the Slack patent operates in bursts to maintain output voltage within a desired range.

SUMMARY OF THE INVENTION

Accordingly, it is an object of the invention to provide a wide input range flyback mode switching power supply operable over a wide input voltage range and in the presence of input voltage transients.

It is another object of the invention to provide such a power supply which is stable under all expected input voltage conditions.

Briefly stated, and in accordance with one aspect of the invention, a regulated flyback switching mode power supply for operation from an unfiltered DC voltage source includes a transformer having at least a primary winding and an output winding, a controlled switching element having a pair of main electrodes and a control electrode, the switching element main electrodes connected in series with the primary winding so as to controllably energize the primary winding from the voltage source. Biasing circuitry is connected to the control electrode for initially causing the switching element to turn ON such that an increasing current flows through the primary winding and a correspondingly increasing magnetic field is produced by the primary winding. The rate of increase is determined at least by the source voltage and the inductance of the primary winding. In order to provide for repetitive or oscillating circuit operation, there are also provided an element for sensing the amount of current flow through the transformer primary winding when the switching element in ON, circuitry for establishing a variable current limit value, and circuitry connected to the control electrode for causing the switching element to turn OFF when sensed current reaches the established current limit value. When the switching element turns OFF, the magnetic field produced by the primary winding collapses to induce voltage and current in the output winding, and the power supply is readied for another switching cycle. The period and duty cycle are determined by the source voltage, the primary winding inductance, and the current limit value.

Additionally, an ouput network is connected to the secondary winding, the output network including a filter capacitor and a rectifier polarized to draw current from the secondary winding to charge the filter capacitor to an output voltage from voltage induced when the switching element turns OFF and to isolate the secondary winding when the switching element in ON and current flow in the primary winding is increasing. To provide continuous output voltage regulation, a negative feedback arrangement is responsive to the output voltage for varying the established current limit value as an inverse function of output voltage, thereby continuously varying the oscillation pulse width and frequency.

In order for the power supply to regulate through an input voltage transient, the various component values are selected such that the oscillation period is less than the duration of expected input voltage transients. For example, a flyback mode power supply oscillating at a frequency of 50 kHz has a period of 20 microseconds, several times shorer than the 80 microsecond typical transient pulse width. The circuit can therefore regulate right through the transient.

In the preferred configuration, the controlled switching element is a transistor. In order to provide rapid ON and OFF switching of the transistor, the transformer additionally has a positive feedback winding connected to the control electrode and polarized so as to supply additional current to the control electrode when the switching transistor is ON and the magnetic field produced by the primary winding is increasing. As a result, the transistor is driven rapidly into saturation. When the transistor is turned OFF and the magnetic field is collapsing, the current supply is removed from the control electrode to more rapidly turn the switching transistor fully off.

In accordance with a more particular aspect of the invention, the controlled switching element is a bipolar transistor connected in common emitter configuration, with one terminal of the primary winding connected to the transistor collector electrode. The element for sensing the amount of current flow through the transformer primary winding is an emitter resistor having one terminal connected to the emitter of the transistor, voltage drop being developed across the emitter resistor in proportion to primary winding current. The circuitry for establishing a variable current limit value comprises a controllable voltage clamp connected between the switching transistor base terminal and the other terminal of the emitter resistor such that the base-emitter junction of the switching transistor becomes reverse-biased as voltage drop across the emitter resistor exceeds the clamp voltage.

In one particular arrangement, the controllable voltage clamp includes a storage capacitor for storing the voltage level representative of the established current limit value, and an isolation diode in series with the storage capacitor. The series combination of the storage capacitor and the isolation diode is connected between the switching transistor base terminal and the other terminal of the emitter resistor. The isolation diode is polarized so as to conduct when transistor bias voltage exceeds capacitor voltage, thereby charging the storage capacitor and limiting voltage rise on the base terminal. A control transistor is connected in common-emitter configuration with its collector and emitter terminals connected across the storage capacitor so as to controllably discharge the capacitor. The negative feedback arrangement comprises a control connection from the output network to the base terminal of the control transistor.

An important aspect of the invention is the provision of a stabilizing network to prevent circuit instabilities due to the negative feedback voltage regulator loop. This is a particularly important consideration for the reason that loop gain increases with input voltage to produce instabilities, expecially during a voltage transient. A major source of this instability is a lagging phase shift due to the output filter network. In particular, in accordance with the invention, a stabilizing network comprises a capacitor and resistor connected in series between the base and collector of the control transistor for providing phase lead to compensate for phase lag introduced by the filter capacitor as well as by the storage capacitor of the controllable voltage clamp.

A power supply embodying the present invention well serves its intended purpose. To illustrate the performance capabilities of the present power supply, the following tables are presented. Performance data for two power supply models are presented. Both models are rated to supply 13±1 v.d.c. at 50 mA over an operating temperature range of −35° C. to +70° C. The low input voltage range model is intended to operate over an input voltage range of 12 to 111 v.d.c., while the high input voltage range model is intended to operate over an input range of 42 to 190 v.d.c.

First, TABLE I below demonstrates by way of example the wide range of applications of the subject power supply, and particularly, the wide range of possible input voltages. Further, as described hereinabove, under heavy load conditions the actual terminal voltage of an exemplary nominal 24 volt battery (12 cells) can be as low as 12.0 volts, and, under regenerative braking conditions, be as high as 31.6 volts. Motor chopper control transients are in addition.

TABLE I

SUMMARY OF TYPICAL APPLICATIONS

| NOMINAL BATTERY VOLTAGE | INDUS- TRIAL TRUCK | ON- ROAD VE- HICLE | MIN- ING VE- HICLE | REPETITIVE PEAK TRANSIENT |
|---|---|---|---|---|
| 24 | X |   |   | 230 Volt |
| 36 | X |   |   | 230 Volt |
| 48 | X |   |   | 230 Volt |
| 54 | X |   | X | 230 Volt |
| 72 | X | X |   | 230 Volt |
| 80 | X |   |   | 230 Volt |
| 84 | X | X |   | 230 or 460 Volt |
| 96 |   | X | X | 460 volt |
| 102 |   |   | X | 460 Volt |
| 108 |   | X | X | 460 Volt |
| 120 |   | X |   | 460 Volt |
| 128 |   |   | X | 460 Volt |
| 144 |   | X |   | 460 Volt |

For satisfying this range of requirements, only two models of power supplies in accordance with the invention are sufficient, differing only in particular component values. Measured input regulation characteristics are summarized in TABLES II and III below:

TABLE II

REGULATION PERFORMANCE OF LOW INPUT VOLTAGE RANGE SUPPLY

| INPUT VOLTAGE | OUTPUT VOLTAGE |
|---|---|
| 10 | 12.28 |
| 12 | 12.65 |
| 15 | 12.71 |
| 24 | 12.73 |
| 40 | 12.75 |
| 60 | 12.76 |
| 80 | 12.75 |
| 100 | 12.75 |
| 120 | 12.75 |
| 140 | 12.75 |
| 150 | 12.75 |

TABLE III

REGULATION PERFORMANCE OF HIGH INPUT VOLTAGE RANGE SUPPLY

| INPUT VOLTAGE | OUTPUT VOLTAGE |
|---|---|
| 30 | 13.12 |
| 42 | 13.21 |
| 68 | 13.25 |
| 84 | 13.25 |
| 100 | 13.25 |
| 120 | 13.25 |
| 140 | 13.25 |
| 160 | 13.26 |
| 180 | 13.26 |
| 200 | 13.26 |
| 220 | 13.27 |
| 240 | 13.29 |

BRIEF DESCRIPTION OF THE DRAWINGS

While the novel features of the invention are set forth with particularity in the appended claims, the invention, both as to organization and content, will be better understood and appreciated from the following detailed description, taken in conjuction with the drawings, in which:

FIGS. 2A and 2B are waveforms of switching transistor collector voltage and current shown on the same time scale;

FIGS. 3A, 3B and 3C are switching transistor collector voltage waveforms, all on the same time scale, illustrating operation at three different input supply voltages;

DETAILED DESCRIPTION OF THE PREFERRED EMBODIMENT

Figure 1:
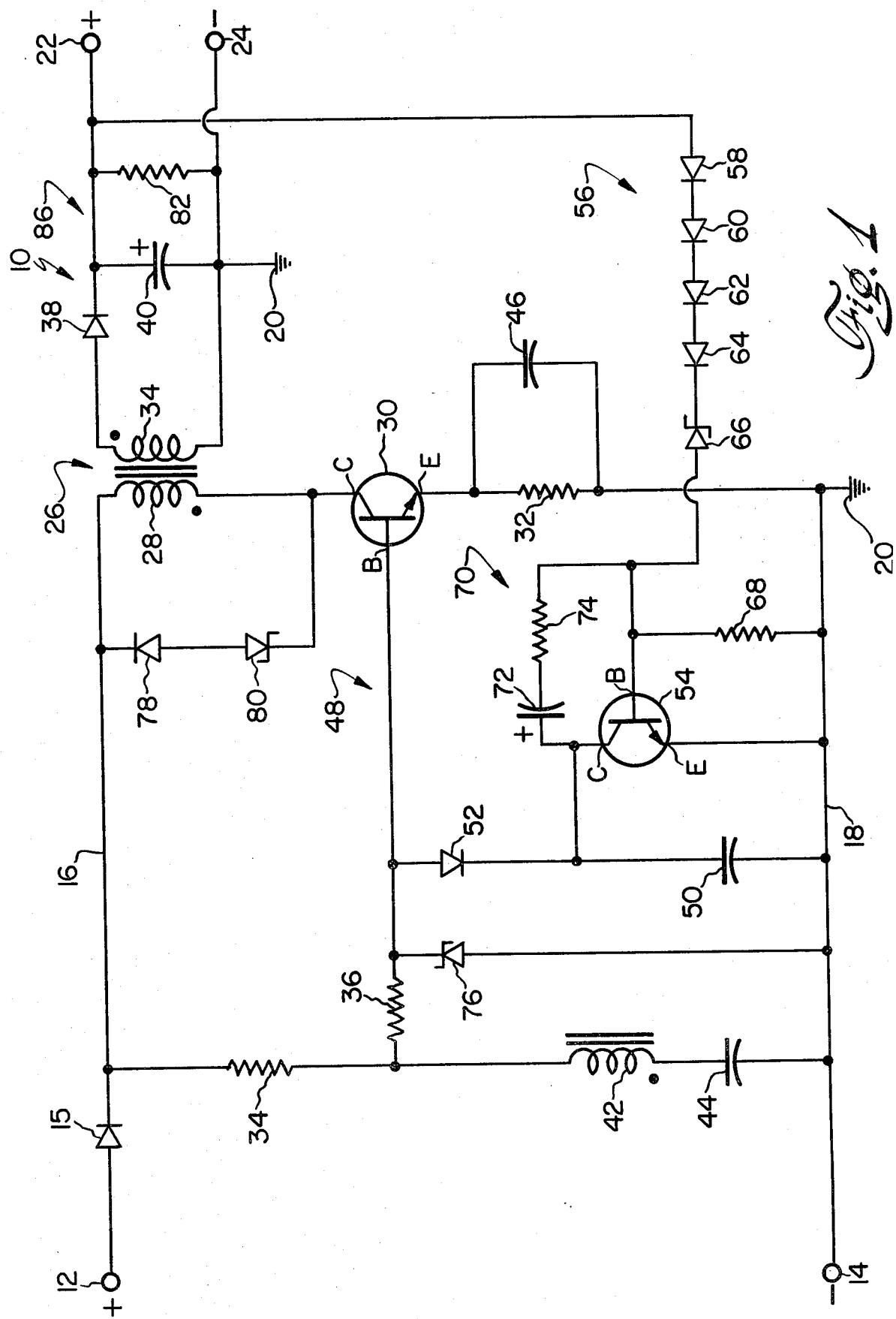
FIG. 1 is a complete electrical schematic diagram of a power supply constructed in accordance with the invention.

Referring first to FIG. 1, an exemplary switching mode power supply in accordance with the invention is generally designated 10. The power supply 10 has respective (+) and (−) input terminals 12 and 14 for connection to an unfiltered DC voltage source such as the drive motor battery of an electric vehicle. For protection against possible reversed input connections, a diode 15 is connected in series between the (+) input terminal 12 and a positive DC supply conductor 16. The (−) input terminal 14 is connected directly to a negative supply conductor 18, which serves as a circuit reference point as indicated by the ground connections 20. The power supply 10 operates to provide a regulated and filtered DC voltage at respective (+) and (−) output terminals 22 and 24.

A flyback transformer 26 has a primary winding 28 connected in series with the main terminals of a controlled switching element 30, preferably an NPN bipolar transistor. To complete the series circuit of the transformer primary winding 28 and the switching transistor 30, the transistor 30 emitter (E) terminal is connected through an emitter resistor 32 to the negative supply conductor 18.

The flyback transformer 26 also has a secondary winding 34 to which is connected an output network 86 comprising a series rectifier diode 38 and a parallel filter capacitor 40.

During the basic operation of the circuitry associated with the flyback transformer 26 as thus far described, the switching transistor 30 is alternately turned ON and OFF. Each time the switching transistor 30 is turned ON, current flows from the input terminals 12 and 14 through the transformer primary winding 28, with the current increasing with a ramp waveform. During this period energy is being stored as magnetic flux in the transformer 26. The rectifier diode 38 is appropriately polarized so as to be back biased during this portion of the operation cycle so that the secondary winding 34 appears as an open circuit. When the switching transistor 30 turns OFF, the magnetic field in the transformer 26 rapidly collapses, inducing a voltage in the secondary winding 34, which voltage is then coupled through the rectifier diode 38 to charge the filter capacitor 40, and supply the output terminals 22 and 24.

Referring to FIG. 1 in somewhat greater detail, the power supply 10 includes a number of important additional elements. To initially turn the switching transistor ON, a biasing circuit including a biasing resistor 34 and a current limiting resistor 36 in series is connected between the positive supply conductor 16 and the transistor 30 base (B) control electrode. The flyback transformer 26 additionally has a feedback winding 42 connected in series with an AC coupling capacitor 44 between the junction of the resistors 34 and 36 and the circuit reference conductor 18. The feedback winding 42 is properly phased so as to provide additional base drive for the switching transistor 30 as current in the primary winding 28 is rising. This ensures rapid turn ON and turn OFF of the switching transistor 30 for minimal heat dissipation in the transistor 30, and higher circuit efficiency.

In addition, an emitter capacitor 46 is connected in parallel with the emitter resistor 32 to improve switching speed by bypassing the impedance of the emitter resistor 32 during switching transitions. Only minimal heat sinking of the transistor 30 is required.

For turning OFF the transistor 30, the emitter resistor 32 serves as an element for sensing the amount of current flow through the primary winding 28, the voltage drop across the emitter resistor 32 representing transformer primary winding 28 current. Circuitry, generally designated 48, for establishing a variable current limit value may also be termed a controllable voltage clamp, and is connected between the switching transistor 30 base (B) terminal and the negative supply conductor 18, and thus to the other end of the emitter resistor 32.

In operation, so long as the voltage drop across the emitter resistor 32 is less than the clamp voltage between the transistor 30 base (B) electrode and the circuit reference point 20, the switching transistor 30 base voltage is free to be higher than the emitter voltage, and thus the transistor 30 remains ON, base drive current being supplied by the current-limiting resistor 36 and the positive feedback winding 42. As voltage drop across the emitter resistor 32 approaches the clamp voltage, the switching transistor 30 can no longer be biased into conduction, and it begins to turn OFF.

The controllable voltage clamp 48 more particularly comprises a storage capacitor 50 for storing a voltage level representative of the established current limit value, and an isolation diode 52 in series with the storage capacitor 50. The series combination of the storage capacitor 50 and the isolation diode 52 is connected between the switching transistor 30 base (B) terminal and the circuit reference conductor 18. The isolation diode 52 is polarized so as to conduct when switching transistor 30 base voltage exceeds capacitor 50 voltage, thereby charging the storage capacitor 50 and limiting voltage rise on the switching transistor 30 base (B) terminal to effect clamping.

In order to vary the clamp voltage, a control transistor 54 is connected in common-emitter configuration, and has its collector (C) and emitter (E) terminals connected across the storage capacitor 50 so as to controllably discharge the capacitor. A negative feedback arrangement, generally designated 56, comprises a series string of forwardly biased temperature compensating diodes 58, 60, 62 and 64, and a voltage-determining Zener diode 66, connected between the output terminal 22 and the control transistor 54 base (B) electrode. A biasing resistor 68 is connected between the control transistor 54 base (B) electrode and the circuit reference conductor 18.

An important aspect of the invention is a stabilizing network 70, the operation of which is described hereinafter, comprising a capacitor 72 and resistor 74 connected in series between the control transistor 54 base (B) and a collector (C) electrodes. The stablizing network 70 adds phase lead to compensate for various phase lags in the system, providing important overall enhancement of the stability, particularly during input voltage transients.

Another element of the circuit is a clamping Zener diode 76. The Zener diode provides a charging path for the coupling capacitor 44, and also ensures more reliable operation by establishing an upper voltage clamp and thus upper current limit value even in the absence of the controllable voltage clamp 48. For protection of the switching transistor 30 and for limiting transient voltages, a conventional snubber network comprises a diode 78 and a Zener diode 80 connected in series across the flyback transformer 26 primary winding 28. Lastly, to improve the voltage regulation under lightly loaded conditions, a minimum load resistor 82 is connected across the output of the power supply 10.

The basic operation of the power supply 10, with important exceptions insofar as aspects of the present invention are concerned, is described in the above-referenced Slack U.S. Pat. No. 3,911,352. In particular, the Slack patent describes, by means of mathematical relationships, the manner in which such a power supply inherently provides a certain degree of self-regulation against changes in input voltage, even in the absence of any type of feedback.

Referring briefly to FIGS. 2A and 2B, there are shown, respectively, voltage and current waveforms measured at the switching transistor 30 when input voltage applied across the input terminals 12 and 14 is a steady 12.0 volts. The time scale of FIGS. 2A and 2B is ten microseconds per horizontal division. In particular, FIG. 2A is a waveform of voltage measured between the switching transistor 30 collector (C) terminal and the circuit reference conductor 18, and FIG. 2B is a waveform of switching transistor 30 and primary winding 28 current. A repetitive or oscillating cycle is depicted, having two separate time intervals. The first time interval, $T_1$, is the interval during which the switching transistor 30 is conducting, and the other time interval, $T_2$, is the time interval during which the switching transistor 30 is not conducting.

Initially, current from the voltage source connected between input terminals 12 and 14 flows through resistors 34 and 36 to the switching transistor 30 base (B) electrode. The transistor 30 begins to switch ON, and its collector voltage begins to drop, defining the very beginning of interval $T_1$ in FIGS. 2A and 2B. Current begins flowing through the primary winding 28 of flyback transformer 26 to the switching transistor collector (C) electrode. By inductive coupling between the primary winding 28 and feedback winding 42, a voltage is developed across the feedback winding 42 of such polarity as to render the transistor 30 even more conductive. This positive feedback causes the switching transistor 30 to be driven into saturation almost immediately, i.e., while the current through primary winding 28 is still small. Thereafter, the impedance of transistor 30 collector and emitter electrodes and emitter resistor 32 in parallel with bypass capacitor 46 is relatively small so that for transient analysis purposes the primary winding 28 may be regarded as being connected directly across the input terminals 12 and 14. After the transistor 30 saturates, the current through the primary winding 28 and transistor 30 increases approximately linearly as a function of time. As this current continues to increase, the potential at the collector (C) electrode of transistor 30 remains at a low value close to the potential of the circuit reference conductor 18. During this time interval $T_1$ while the primary winding 28 continues to be charged by the increasing current therethrough, current flows from the feedback winding 42 through the current limiting resistor 36, through the base and emitter electrodes of the transistor 30, and through the emitter resistor 32, to the terminal of the AC coupling capacitor 44 which is connected to the circuit reference conductor 18. The result of this current flow is to charge the coupling capacitor 44 with a polarity such that the terminal of capacitor 44 which is coupled to the base (B) electrode of the transistor 30 via feedback winding 42 and the resistor 36 is charged negatively.

As the current through the switching transistor 30 and primary winding 28 continues to increase, current flows through the emitter resistor 32, causing the voltage developed between the emitter (E) electrode and the reference conductor 18 to increase. The emitter voltage continues to increase until the voltage between the transistor 30 base (B) electrode and reference line 18 reaches a value approximately equal to the clamp voltage established by the controllable voltage clamp 48. At this point, current flow is diverted through the isolation diode 52 to the storage capacitor 50 and control transistor 54, thus substantially preventing further increase of the base current of the transistor 30, and therefore resulting in no further increase in the collector current thereof.

As soon as the current through the switching transistor 30 and the flyback transformer 26 primary winding 28 stops increasing, the voltage developed across the feedback winding 42 immediately reverses polarity, and the negative potential coupled through the capacitor 44 to the switching transistor 30 base (B) electrode turns the transistor 30 OFF, defining the beginning of interval $T_2$ in FIG. 2A.

At this point, the magnetic field in the flyback transformer 26 rapidly collapses. An inductive spike in the collector voltage waveform of FIG. 2A is limited by the snubber network comprising the diodes 78 and 80. Voltage is induced in the secondary winding 34, and conducted through the rectifier diode 38 to charge the filter capacitor 40.

During the time that the primary winding 28 is discharging, i.e., the period $T_2$ during which the transistor 30 is non-conductive, the decreasing current through the primary winding 28 causes a voltage to be developed across the feedback winding 42 of such polarity that the end of winding 42 connected to the current-limiting resistor 36 is relatively negative and the other end of the winding 42 is relatively positive. This potential difference keeps the switching transistor 30 biased OFF, and additionally causes the coupling capacitor 44 to be recharged to a positive potential relative to the reference line 18 by current flow through the Zener diode 76, which is forward biased at this time. As soon as the capacitor 44 has been charged to a potential sufficient to overcome any voltage developed across the feedback winding 42 and thereby cause the transistor 30 base (B) electrode to become positive (relative to the circuit reference conductor 18), current begins to flow into the base (B) electrode, causing the transistor 30 to again become conductive and, by virtue of this positive feedback from primary winding 28 to feedback winding 42, rapidly become saturated. The oscillation cycle is thus repeated.

The oscillation pulse width or period i.e., the time interval $T_1$ plus $T_2$, is determined primarily by the clamp voltage, emitter resistor 32, the inductance of primary winding 28 and the supply voltage across input terminals 12 and 14.

As seen in FIG. 1, the rectifier diode 38 is polarized such that current is drawn from the secondary winding 34 only during the time interval $T_2$ when the transistor 30 is OFF. As discussed in the above-referenced Slack U.S. Pat. No. 3,911,352, coupling between the primary winding 28 and secondary winding 34 for flow of secondary current takes place only during the time interval $T_2$ during which the switching transistor 30 is nonconductive, and during which no current is drawn through the input terminals 12 and 14. Any spikes or other impulses coupled to the power supply circuit 10 via input terminals 12 and 14 are therefore well isolated from the secondary winding 34.

As also discussed in the Slack patent, the circuit 10 inherently provides good line regulation. Specifically, the amount of energy stored in the primary winding 28 inductance during each cycle of oscillation inherently is approximately independent of the input voltage. Contrary to the present invention, however, the oscillation frequency of the Slack circuit is "only slightly" affected by variations in the source voltage, in the absence of feedback as provided by the present invention.

The negative voltage feedback path 56 applied to the controllable voltage clamp 48 provides a relatively stable output voltage over the wide input voltage range as well as provides load regulation, by modulating the duty cycle and frequency of the oscillation. The oscillation frequency varies over the range of 20 kHz to 200 kHz, and both the pulses width and the frequency vary as input voltage is varied. The primary means of control, however, is by modulation of the pulse width.

For feedback voltage control, assuming an increase in output voltage, the base current of the control transistor 54 increases, causing the voltage on the storage capacitor 50 to decrease. The voltage across capacitor 50 provides a clamp on the switching transistor 30 base by virtue of the isolation diode 52. Since the voltage is rising linearly at the emitter (E) of the switching transistor 30, this decrease in clamp voltage causes the switching transistor 30 to turn off more quickly than otherwise. The reduced turn on time (time interval $T_1$) of the switching transistor 30 results in the pulse width and frequency modulation, in turn providing less energy during the flyback time (time interval $T_2$) to the output network 36. This in turn causes output voltage increases to be limited.

By way of example, FIGS. 3A, 3B and 3C illustrate transistor 30 collector voltage waveforms for input voltages of 12 volts, 24 volts and 100 volts respectively. These three waveforms are shown on a time scale of ten microseconds per horizontal division. As may be seen from a comparison of these three waveforms, the time interval $T_1$ when the switching transistor 30 is ON decreases significantly as input voltage increases. This is due to the more rapid rate of change of current through transformer 26 primary winding 28, the clamp voltage of the capacitor 50, the action of the isolation diode 52, the higher input voltage applied to the primary winding, and through the action of the feedback path 56. Flyback time (interval T$_2$) also decreases, although not as significantly, because less energy is stored in the transformer 26 during each cycle.

Figure 4A:
FIGS. 4A and 4B are waveforms showing output voltage and switching transistor collector voltage during input voltage transients.
Figure 4B:
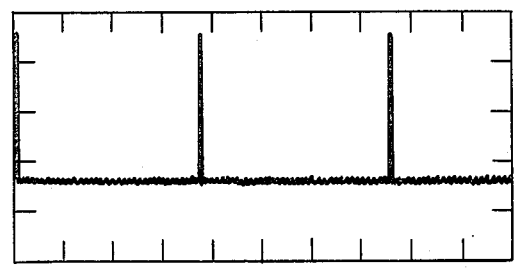
Figure 5A:
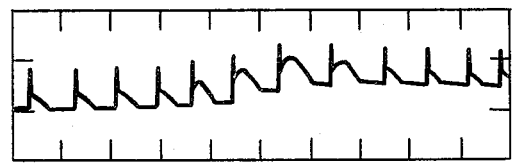
FIGS. 5A and 5B are voltage waveforms at the same circuit points as FIGS. 4A and 4B, but on a greatly expanded time scale.
Figure 5B:
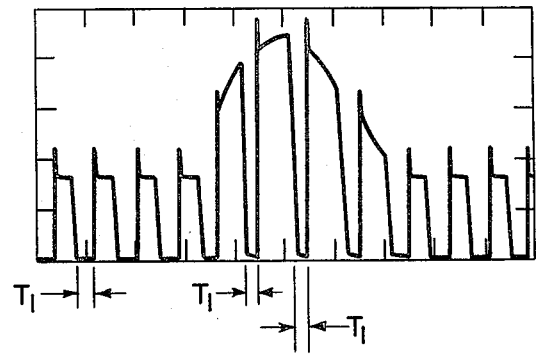

The transient response performance of the power supply 10 is shown in FIGS. 4A and 4B and, in somewhat greater detail, in FIGS. 5A and 5B, which are on an expanded time scale. Specifically, FIGS. 4A and 4B are on a time scale of one millisecond per division, while FIGS. 5A and 5B are on a time scale of twenty microseconds per horizontal division.

The upper waveforms in each case, that is, FIGS. 4A and 5A, show output voltage across the filter capacitor 40, showing ripple and transient waveforms on a 50 millivolt per division vertical scale.

The lower waveforms in each case, that is FIGS. 4B and 5B show a 460 volt input transient as it appears on the collector of the switching transistor 30. As seen in FIG. 4A, only a slight disturbance in the output results. The expanded scale of FIG. 5B illustrates the manner in which the circuit regulates through a relatively wider input voltage transient. For example, the particular input transient of FIGS. 4B and 5B is approximately eighty microseconds wide. However, the switching period (T$_1$ plus T$_2$) of the flyback power supply 10 is significantly less, approximately twenty microseconds, allowing the circuit to regulate right through the input voltage transient. This regulation is evidenced by a reduction in the time intervals T$_1$ during the period of the transient.

Although no waveform is shown, the circuit also regulates well for narrow transients. With narrow transients, and depending upon the precise time of occurrence, and duration, only a single oscillation pulse might be shortened through regulation action.

To illustrate another aspect of the invention, without the stabilization network 70 comprising the capacitor 72 and resistor 74 the circuit 10 may exhibit a low level instability which appears as increased ripple in the output. Particularly, as input voltage is increased, or during a transient, the gain of the regulator portion of the circuit increases. In the absence of the stabilization network 70, this causes unstable or near unstable behavior in the small signal sense. By providing phase lead by virtue of resistor 74 and capacitor 72 to compensate for the phase lag of filter capacitor 40 and storage capacitor 50, the circuit is unconditionally stable. Additionally, with the stabilization network 70 in place, the value of the storage capacitor 50 can be reduced significantly.

Further, with the stabilization network 70 in place, output filtering is not required merely to mask low level instabilities, and a simpler output network can be employed. Specifically, a simple filter capacitor 70 may be employed, rather than a more extensive output filter involving, for example, a series inductor in a pi-section low pass filter configuration.

Figure 6A:
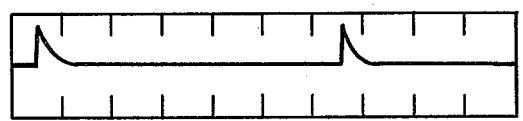
FIG. 6A is an output voltage waveform during normal operation, on a compressed time scale compared to FIG. 5A.
Figure 6B:
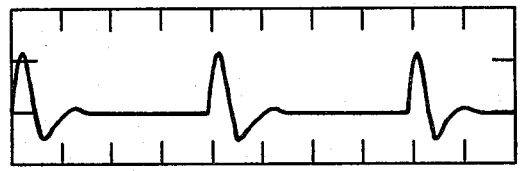
FIGS. 6B and 6C are output voltage waveforms, drawn on the same time scale as is FIG. 6A, illustrating the effect on the output when a stabilizing network in accordance with the invention is removed.
Figure 6C:

This may better be seen with reference to the waveforms of FIGS. 6A, 6B and 6C. FIG. 6A is an output voltage waveform with the stability network 70 in place. As may be seen in FIG. 6A, during this operation a slight, approximately 30 millivolt, rise occurs each time the large (230 volt) transient voltage pulse occurs at input terminals 12 and 14. However, there is no ringing or other evidence of instability, and the circuit may be considered to be critically damped.

In contrast, FIGS. 6B and 6C illustrate output waveforms present in the absence of the stabilizing network 70 comprising the capacitor 72 and resistor 74. During circuit operation as depicted in FIG. 6B, the input voltage was 15 volts plus the 230 volt transient. During circuit operation as depicted in FIG. 6C, the input voltage was 40 volts plus the 230 volt transient. During circuit operation as depicted in FIGS. 6A, 6B and 6C, the value of the output filter capacitor 40 was 200 microfarads.

To better enable those skilled in the art to practice the invention without undue experimentation, the following TABLE IV provides component values by way of example. However, it will be appreciated that these component values are in no way intended to limit the scope of the claimed invention:

TABLE IV

| EXEMPLARY COMPONENT VALUES | | | |
|---|---|---|---|
| | Reference No. | Low Input Range Model | High Input Range Model |
| Transistors: | 30 | TIP 50 | MJE 12007 |
| | 54 | GES 6014 | GES 6014 |
| Diodes: | 15 | G.E. A15A | G.E. A15A |
| | 38 | G.E. A114A | G.E. A114A |
| | 52, 58, 60, 62, 64 | 1N4001 | 1N4001 |
| | 78 | 1N4006 | 1N4006 |
| Zener Diodes: | 66 | 1N4740 | 1N4740 |
| | 76 | 1N4620 | 1N4620 |
| | 80 | 1N4757 | 1M150ZS10 |
| Capacitors: | 40 | 220 mfd. | 220 mfd. |
| | 44 | 0.1 mfd. | 0.1 mfd. |
| | 46 | 0.33 mfd. | 1.0 mfd. |
| | 50 | 1.0 mfd. | 1.0 mfd. |
| | 72 | 10.0 mfd. | 10.0 mfd. |
| Resistors: | 32 | 4.3 Ohms | 18 Ohms |
| | 34 | 100 K Ohms | 100 K Ohms |
| | 36 | 560 Ohms | 560 Ohms |
| | 68 | 100 Ohms | 100 Ohms |
| | 74 | 300 Ohms | 300 Ohms |
| | 82 | 3.3 K Ohms | 3.3 K Ohms |
| Transformer: | 26 | 31T, 17T, 17T | 136T, 23T, 23T |

While a specific embodiment of the invention has been illustrated and described herein, it is realized that numerous modifications and changes will occur to those skilled in the art. It is, therefore, to be understood that the appended claims are intended to cover all such modifications and changes as fall within the true spirit and scope of the invention.

What is claimed is:

1. A regulated flyback switching mode power supply for operation from an unfiltered DC voltage source, said power supply comprising:

a transformer having at least a primary winding;

a controlled switching element having a pair of main electrodes and a control electrode, said switching element main electrodes being connected in series with said primary winding so as to controllably energize said primary winding from the voltage source;

biasing circuitry connected to said control electrode for initially causing said switching element to turn ON such that an increasing current flows through said primary winding and a correspondingly increasing magnetic field is produced by said primary winding, the rate of increase being at least determined by the source voltage and the inductance of said primary winding;

an element for sensing the amount of current flow through said transformer primary winding when said switching element is ON;

circuitry coupled to said control electrode for establishing a variable current limit value;

circuitry responsive to said element for sensing current flow and being connected to said control electrode for causing said switching element to turn OFF when sensed current reaches the established current limit value, such that the magnetic field produced by said primary winding collapses and said power supply is readied for another switching cycle, said power supply continuously oscillating with a period and duty cycle determined by the source voltage, the primary winding inductance, and the current limit value;

an output network connected to said transformer, said output network including a filter capacitor and a rectifier polarized to draw current from said transformer to charge said filter capacitor to an output voltage from voltage induced when said switching element turns OFF; and a negative feedback arrangement responsive to the output voltage and coupled to said circuitry for establishing a variable current limit value, said negative feedback arrangement varying the established current limit value as an inverse function of output voltage.

2. A regulated switching mode power supply according to claim 1, wherein said negative feedback arrangement includes elements introducing phase lead compensation to compensate for phase lag introduced by said output filter capacitor.

3. A regulated switching mode power supply according to claim 1, wherein the oscillation period is less than the duration of expected input voltage transients, whereby said power supply tends to regulate through an input voltage transient.

4. A regulated switching mode power supply according to claim 2, wherein the oscillation period is less than the duration of expected input voltage transients, whereby said power supply tends to regulate through an input voltage transient.

5. A regulated switching mode power supply according to claim 1 wherein said transformer includes an output winding to which said output network is connected.

6. A regulated switching mode power supply according to claim 5, wherein the oscillation period is less than the duration of expected input voltage transients, whereby said power supply tends to regulate through an input voltage transient.

7. A regulated switching mode power supply according to claim 5, wherein:

said controlled switching element comprises a transistor; and wherein said transformer includes a positive feedback winding connected to said control electrode and polarized so as to supply additional current to said control electrode when said transistor is ON and the magnetic field produced by the primary winding is increasing, whereby said transistor is driven rapidly into saturation, and so as to remove the current supply from said control electrode when said transistor is turned OFF and the magnetic field is collapsing, whereby said transistor is more rapidly turned fully OFF.

8. A regulated switching mode power supply according to claim 5, wherein:

said controlled switching element comprises a bipolar transistor connected in common-emitter configuration, with one terminal of said primary winding connected to the transistor collector electrode; and wherein said element for sensing the amount of current flow through said transformer primary winding comprises an emitter resistor having one terminal connected to the emitter of said transistor, voltage drop being developed across said emitter resistor in proportion to primary winding current; and wherein said circuitry for establishing a variable current limit value comprises a controllable voltage clamp connected between the switching transistor base terminal and the other terminal of said emitter resistor such that the base-emitter junction of said switching transistor becomes reverse-biased as voltage drop across said emitter resistor exceeds the clamp voltage.

9. A regulated switching mode power supply according to claim 8, wherein:

said controllable voltage clamp comprises:

a storage capacitor for storing a voltage level representative of the established current limit value, an isolation diode in series with said storage capacitor, with the series combination of said storage capacitor and isolation diode being connected between the switching transistor base terminal and the other terminal of said emitter resistor, said isolation diode being polarized so as to conduct when transistor base voltage exceeds capacitor voltage, thereby charging said storage capacitor and limiting voltage rise on the base terminal, and a control transistor connected in common-emitter configuration and having collector and emitter terminals connected across said storage capacitor so as to controllably discharge said capacitor; and wherein:

said negative feedback arrangement comprises a control connection from said output network to the base terminal of said control transistor.

10. A regulated switching mode power supply according to claim 9, which further comprises a stabilizing network in the form of a capacitor and resistor connected in series between the base and collector of said control transistor for providing phase lead to compensate for phase lags introduced by said storage capacitor and said filter capacitor.

11. A regulated flyback switching mode power supply for operation from an unfiltered DC voltage source, said power supply comprising:

a transformer having at least a primary winding and an output winding;

a bipolar switching transistor connected in common-emitter configuration with collector and emitter electrodes connected in series with said primary winding so as to controllably energize said primary winding from the voltage source, one terminal of said primary winding being connected to the transistor collector electrode;

biasing circuitry connected to the base electrode of said switching transistor for initially causing said switching element to turn ON such that an increasing current flow through said primary winding and a correspondingly increasing magnetic field is produced by said primary winding, the rate of increase being at least determined by the source voltage and the inductance of said primary winding;

an emitter resistor having one terminal connected to the emitter of said transistor for sensing the amount of current flow through said transformer primary winding when said switching element is ON, voltage drop being developed across said emitter resistor in proportion to primary winding current;

circuitry for establishing a variable current limit value in the form of a controllable voltage clamp connected between the switching transistor base terminal and the other terminal of said emitter resistor such that the base-emitter junction of said switching transistor becomes reverse-biased as voltage drop across said emitter resistor exceeds the clamp voltage and the magnetic field produced by said primary winding then collapses, inducing voltage and current in said output winding, said power supply continuously oscillating with a period and duty cycle determined by the source voltage, the primary winding inductance, and the current limit value;

said transformer additionally having a positive feedback winding connected to said control electrode and polarized so as to supply additional current to said control electrode when said transistor is ON and the magnetic field produced by the primary winding is increasing, whereby said transistor is driven rapidly into saturation, and so as to remove the current supply from said control electrode when said transistor is turned OFF and the magnetic field is collapsing, whereby said transistor is more rapidly turned fully OFF;

an output network connected to said secondary winding, said output network including a filter capacitor and a rectifier polarized to draw current from said secondary winding to charge said filter capacitor to an output voltage from voltage induced when said switching element turns OFF; and a negative feedback arrangement coupled between the output network and said controllable voltage clamp, said negative feedback arrangement varying the controllable voltage clamp and thus the established current limit value as an inverse function of output voltage.

12. A regulated switching mode power supply according to claim 11, wherein the oscillation period is less than the duration of expected input voltage transients, whereby said power supply tends to regulate through an input voltage transient.

13. A regulated switching mode power supply according to claim 11, wherein:
said controllable voltage clamp comprises:
a storage capacitor for storing a voltage level representative of the established current limit value,
an isolation diode in series with said storage capacitor, with the series combination of said storage capacitor and isolation diode being connected between the switching transistor base terminal and the other terminal of said emitter resistor, said isolation diode being polarized so as to conduct when transistor base voltage exceeds capacitor voltage, thereby charging said storage capacitor at a rate directly related to input voltage and limiting voltage rise on the base terminal, and
a control transistor connected in common-emitter configuration and having collector and emitter terminals connected across said storage capacitor so as to controllably discharge said capacitor; and wherein:
said negative feedback arrangement comprises a control connection from said output network to the base terminal of said control transistor.

14. A regulated switching mode power supply according to claim 13, which further comprises a stabilizing network in the form of a capacitor and resistor connected in series between the base and collector of said control transistor for providing phase lead to compensate for phase lags introduced by said storage capacitor and said filter capacitor.

15. A regulated flyback switching mode power supply according to claim 11, wherein said negative feedback arrangement includes elements introducing phase lead compensation to compensate for phase lag introduced by said output filter capacitor.

* * * * *